United States Patent [19]
Parker

[11] Patent Number: 5,323,652
[45] Date of Patent: Jun. 28, 1994

[54] THERMOCHROMIC LEVEL INDICATOR

[76] Inventor: Robert Parker, 212 Wildhorse Dr., Palm Desert, Calif. 92260

[21] Appl. No.: 14,633

[22] Filed: Feb. 8, 1993

[51] Int. Cl.$^5$ .............................................. G01F 23/22
[52] U.S. Cl. ................................................... 73/295
[58] Field of Search ........................................ 73/295

[56] References Cited

U.S. PATENT DOCUMENTS 3,696,675 10/1972 Gilmour ................... 73/295
4,358,955 11/1982 Rait ......................... 73/295

FOREIGN PATENT DOCUMENTS 0119072 9/1984 European Pat. Off. .............. 73/295
0132233 4/1985 European Pat. Off. .............. 73/295
3345593 4/1985 Fed. Rep. of Germany ........ 73/295

Primary Examiner—William A. Cuchlinski, Jr.
Assistant Examiner—W. Morris Worth
Attorney, Agent, or Firm—Renner, Otto, Boisselle & Sklar

[57] ABSTRACT

A thermochromic level indicator for determining the level of a material inside a container includes a temperature responsive strip including at least two thermochromic materials of different opacities and transition temperatures, the thermochromic materials with greater opacity having relatively lower transition temperatures than the thermochromic materials with lesser opacities. Other accurate thermochromic level indicators are also disclosed.

16 Claims, 1 Drawing Sheet

THERMOCHROMIC LEVEL INDICATOR

FIELD OF THE INVENTION

The present invention relates generally to a device for determining the volum of a material within a container, and, more particularly, to a thermochromic device for determining the level of a material within a container based on the rate of thermal dissipation of the outer surface of the container.

BACKGROUND OF THE INVENTION

It is often desirable to measure the volume or level of a material within a tank or other container without opening the container or weighing the container. One avenue of measuring the volume or level of the material within a container employs thermochromic materials which change from one color to another or from opaque to transparent or vice-versa at certain transition temperatures. Since the surface of the container will have a different rate of heat transfer at the surface areas adjacent the filled volume of the container as opposed to the surface areas adjacent the unfilled volume of the container, during periods of heating or cooling, a thermochromic material can reasonably indicate the level of material in the container.

One exemplary application of a thermochromic level indicator is on a propane tank, such as for a gas grill. In such an application, a strip of thermochromic material may be adhered to the outer surface of the propane tank. The strip is then heated above the transition temperature of the thermochromic material and allowed to cool. The portion of the strip adhered to the tank surface adjacent the liquid propane in the tank will tend to cool faster than that adhered to the tank adjacent the empty volume, since the propane will act as an improved heat sink over the empty volume. Consequently, the strip adjacent the volume of liquid propane will cool through its transition temperature and change from transparent to a color before the rest of the strip, thus permitting the level of liquid propane in the tank to be ascertained until the remaining portion of the strip also cools below its transition temperature. Since the rate of heat transfer changes abruptly at the interface of the filled and empty portions of the tank, the thermochromic layer will exhibit an abrupt color difference at the interface for a period of time sufficient to determine the liquid or more dense level in the tank.

It is desirable that the thermochromic strips change states with the addition of a relatively small amount of heat. However, the strips are thus often usable only over relatively narrow ranges of ambient temperatures.

Some of these level indicators are permanently adhered to the tank wall and thus suffer from an inability to be transferred from one tank to another. Other level indicators are adhered to a magnetic strip which can be temporarily affixed to the tank. However, the magnetic strip adds more thermal mass and thus tends to reduce the accuracy of the device.

SUMMARY OF THE INVENTION

The present invention relates to a number of embodiments of versatile level indicators which are accurate and can be used over a broad range of ambient temperatures.

In accordance with one embodiment of the present invention, a transportable thermochromic level indicator for determining the level of a material inside a container includes a temperature responsive strip including at least one thermochromic material, and magnetic means for holding said temperature responsive strip in direct contact with said container, said magnetic means being positioned on said temperature responsive strip opposite said container.

In accordance with another aspect of the present invention, a thermochromic level indicator includes a thermochromic strip having a non-viewing side for affixing the thermochromic strip to the container, and a removable magnetic strip of sufficient size substantially to cover the thermochromic strip to shield it from ultraviolet radiation when not in use.

In accordance with a further aspect of the invention, a thermochromic level indicator includes an elongate thermochromic strip, a heating element for heating the thermochromic strip above its transition temperature when a current is supplied to the heating element, the heating element being applied to a non-viewing side of the thermochromic strip.

In accordance with a still further aspect of the invention, a thermochromic level indicator for determining the level of a material inside a container includes a temperature responsive strip of at least two thermochromic materials of different opacities and transition temperatures, the thermochromic materials with greater opacity having relatively lower transition temperatures than the thermochromic materials with lesser opacities. In some instances, at least one of the thermochromic material may exhibit hysteresis upon cooling from a temperature above its transition temperature to a temperature below its transition temperature.

The foregoing and other features of the invention are hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENT OF THE INVENTION

Figure 1:
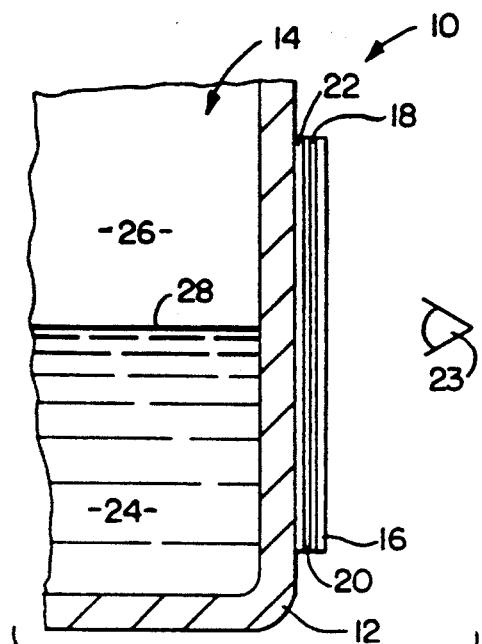
FIG. 1 is a fragmentary cross sectional view of a thermochromic level indicator in accordance with one embodiment of the present invention.

With reference to the several figures, and initially to FIG. 1, there is shown a cross sectional view of a temperature responsive thermochromic level indicator 10 constructed in accordance with one embodiment of the present invention and affixed to a wall 12 of a propane tank 14. The level indicator 10 preferably includes an elongate transparent film 16, such as a polyester film, upon which a number of layers 18, 20 of thermochromic materials are applied. A passive opaque backing layer 22 of a certain color or white is applied to the thermochromic layer 20 remote from the transparent film 16. The thermochromic indicator 10 is affixed such as by tape or adhesive to the wall 12 of the propane tank 14 with the passive opaque layer 22 being in intimate contact with the tank wall and the transparent film 16 facing the viewer 23. Consequently, the line of sight of the viewer 23 would be through the transparent film 16 through the thermochromic layers 18 and 20, when in a transparent state, to the passive opaque backing layer 22. The transparent layer 16 may also include an ultraviolet (UV) radiation protection layer or may be constructed of a material which does not allow the transmission of UV radiation so as to prevent deterioration of the thermochromic layers 18, 20 from excessive exposure to the sun or other UV source.

While the operation of the thermochromic level indicators specifically discussed herein is with reference to their application to a propane tank, it will be appreciated that this is but one exemplary use of the present invention and that the thermochromic level indicators of the present invention can be used to measure the level of materials in a variety of containment media. The materials may be liquids, liquified gasses, or solids.

Preferably, the thermochromic layer 18 immediately adjacent the transparent film 16 is of a lower transition temperature and a lesser opacity than succeeding layers of thermochromic materials applied more remote from the transparent film, for example, thermochromic layer 20. It is also preferable that the transition temperatures and opacities increase for each successive thermochromic layer applied from the transparent film 16 toward the passive opaque layer 22.

It is desirable that the thermochromic layers 18, 20 are reversible with different colors below their respective transition temperatures and different transition temperatures which are both above the ambient temperature of the tank 14 and liquid and gaseous contents 24, 26. By way of example, the thermochromic layer 18 immediately adjacent the transparent film 16 may be black below its transition temperature of 27° C. and transparent above that transition temperature, and the thermochromic layer 20 more remote from the transparent film 16 may be magenta below its transition temperature of 35° C. and transparent above that transition temperature. Consequently, if the temperature of the thermochromic level indicator 10 is elevated above the transition temperatures of both the thermochromic layers 18 and 20 by some means and then allowed to cool toward the ambient temperature, a discrete area of the level indicator 10 will initially appear white, then turn magenta and then black as it cools through the transition temperatures of the thermochromic layers 20 and then 18.

Figure 2:
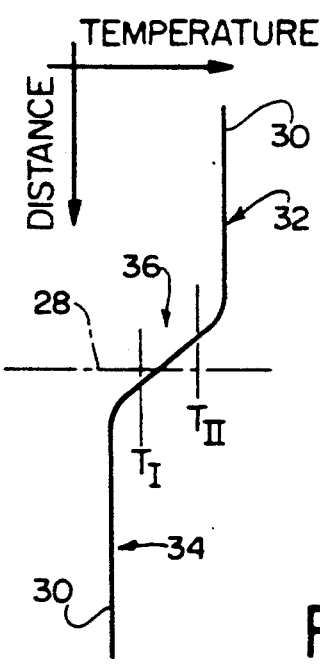
FIG. 2 is a graphical illustration of temperature as a function of location along the wall of the propane tank indicating the temperature gradient along the tank wall.

Referring also to FIG. 2, there is shown a graphical illustration of temperature as a function of location on the tank wall 12 at a time shortly after the level indicator 10 has been heated above the transition temperatures of the thermochromic layers 18 and 20. The transition temperatures of the thermochromic materials 18 and 20 are identified in FIG. 2 as $T_I$ and $T_{II}$, respectively. The horizontal dashed line 28 extending through FIG. 2 corresponds to the interface 28 between the liquid volume 24 and the gaseous volume 26 in the tank 14. It is apparent from FIG. 2 that the temperature of the level indicator 10 above the interface 28 is significantly higher than its temperature below the interface 28 due to the increased rate of heat transfer over the area of thermochromic level indicator adjacent the liquid filled portion 24 of the tank 14. The portion 32 of the temperature gradient curve 30 closest to the gaseous volume 26 is above the transition temperature of the thermochromic layers 18 and 20, whereas the portion 34 of the temperature gradient curve 30 nearest the liquid 24 is below the transition temperatures 18, 20 of the thermochromic layers with the portion 36 near the interface 28 being near the transition temperatures of the thermochromic layers. It is also apparent that the thermal gradient is very abrupt near the interface 28 of the liquid contents 24 and gaseous contents 26 of the tank 14.

Figure 3:
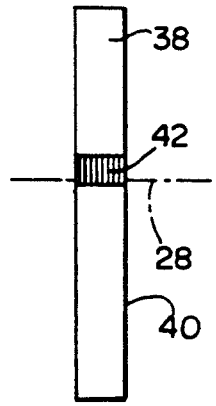
FIG. 3 is an illustration of the display provided by the thermochromic level indicator of FIG. 1 soon after the level indicator has been heated and allowed to begin cooling.
Figure 4:
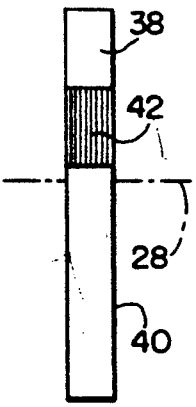
FIG. 4 is an illustration of the display provided by the thermochromic level indicator of FIG. 1 a short time after that of FIG. 3.

The temperature gradient curve 30 of FIG. 2 would yield a display on the level indicator 10 such as shown in FIGS. 3 and 4, with the display illustrated FIG. 3 being closer in time to the initial heating than the display illustrated in FIG. 4. The horizontal dashed line 28 in FIGS. 3 and 4 represents the interface 28 between the liquid filled volume 24 and gaseous volume 26 within the tank 14 as in FIG. 2. As shown in FIG. 3, the portion 38 of the level indicator 10 slightly above the interface 28 is substantially white since this portion of the level indicator is at a temperature above the transition temperatures of both thermochromic layers 18, 20 rendering them transparent and the white opaque backing layer visible.

The portion 40 of the level indicator 10 at the interface 28 and below is black since the liquid volume 24 of the tank 14 acts as a good heat sink and rapidly cools this portion of the level indicator 10 below the transition temperatures $T_I$, $T_{II}$ of the thermochromic layers 18, 20, respectively. Since the thermochromic layer 18, which is black below its transition temperature $T_I$, is closer to the viewer 23 it hides the thermochromic layer 20 in the portion 40 which is magenta below its transition temperature $T_{II}$.

The portion 42 of the level indicator 10 immediately above the interface 28 is at a temperature slightly above the transition temperature $T_I$ of the thermochromic layer 18, but below the transition temperature $T_{II}$ of the thermochromic layer 20. Thus, the portion 42 is visible as a narrow band of magenta, represented by vertical lines, since the thermochromic layer 18 is transparent in this region.

Consequently, the interface 28 between the liquid contents 24 and the gaseous contents 26 in the tank 14 is visible as the magenta-black interface on the display and the level or volume of liquid within the tank is readily discernable as the black region of the display.

As the level indicator 10 continues to cool, the portions of the thermochromic layers 18 and 20 at a temperature below their respective transition temperatures will continue to increase and will propagate towards the top of the indicator, as shown in FIG. 4 which illustrates the indicator display shortly later in time than the display shown in FIG. 3. Further, as the area 42 of the display which is colored magenta increases, the size of the magenta area tends to indicate to the viewer that the actual interface 28, and thus level of the liquid 24 in the tank 14 is somewhat below the interface between the black 40 and magenta areas 42. As the thermochromic level indicator 10 continues to cool toward the ambient temperature, it will eventually reverse completely to the black state as the thermochromic layer 18 being closest to the viewer completely covers the magenta thermochromic layer 20 and the white passive backing 22.

The use of two or more thermochromic materials improves the accuracy of the thermochromic level indicator by helping the user to distinguish between variations in the color and thus the true interface between the fluid and gaseous levels in the tank. The use of two or more thermochromic materials can also be used to compensate for large variances in ambient temperature, such as those typically occurring over different seasons. For example, if two thermochromic materials are used with substantially different transition temperatures, one being high and the other being low, and if the ambient temperature were to exceed the transition temperature of one material, the material with the higher transition temperature could still be used to provide a relatively accurate level indication. Moreover, when more than one thermochromic material is used, not only is the accuracy enhanced but the amount of energy required for heating the thermochromic strip is minimized since the thermochromic materials may be chosen closer to the ambient temperature without rendering the device completely unusable at certain ambient temperatures.

The thermochromic materials can be applied to the transparent film in many different manners including silk screening and other printing and coating methods. In some instances it may be desirable to use microencapsulated thermochromic materials which can then be mixed together and printed upon the transparent film in one step, such as by using a silk screening technique.

While many different types of thermochromic materials may be used in connection with the level indicator of the present invention, preferably a thermochromic material is chosen which exhibits hysteresis. Such a material, once heated above its transition temperature, must be subcooled below the transition temperature by a few degrees before reversing its state from transparent to its original color. The use of such materials will tend to prolong the duration over which the interface, and thus the level of the liquid within the tank, is accurately displayed.

Figure 5:
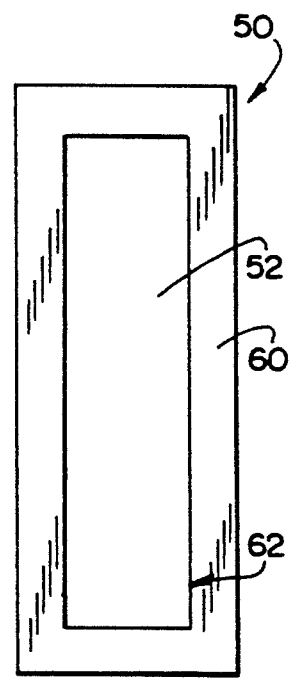
FIG. 5 is an illustration of an alternate embodiment of a thermochromic level indicator which can be magnetically affixed to a tank.
Figure 6:
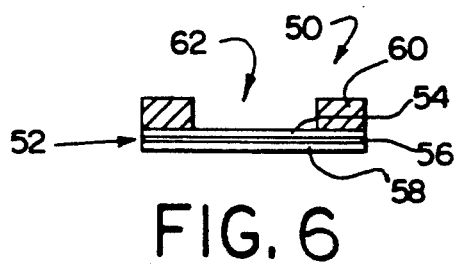
FIG. 6 is a cross sectional view of a thermochromic level indicator of FIG. 5.

Referring now to FIGS. 5 and 6 there is shown a thermochromic level indicator 50 constructed in accordance with an alternative embodiment of the invention. The thermochromic level indicator 50 includes a thermochromic strip 52 such as described above relative to FIG. 1 including a transparent film having at least one thermochromic layer applied thereto with preferably also a passive backing layer applied to the thermochromic layer. Applied to the transparent layer opposite the thermochromic layer 56 and opaque backing layer 58 is a preferably rectangular shape magnetic material having a preferably rectangular shape opening 62 through which the thermochromic strip 52 may be viewed. The magnetic material 60 can be a relatively thin sheet of flexible plastic having a ferrite material dispersed therein. Such a material is essentially an insulator which does not significantly increase the thermal mass or cause a perturbation in the heat transfer rate. The level indicator 50 may then be applied to a metallic tank with the opaque backing 58 in intimate contact with the wall of the tank and the magnetic material 60 holding it in intimate contact with the tank. The magnetic material may be constructed in other forms, for example, parallel magnetic strips disposed so as to permit viewing of the thermochromic layer therebetween, which adequately hold the level indicator to the tank. Such a level indicator 50 can be used to indicate the level of liquid in the tank such as described above and can also be transported between different tanks.

A variety of means may be used to heat a thermochromic level indicator such as those described above to a temperature above the transition temperatures of the thermochromic materials employed. One method of elevating the temperature is by pouring relatively warm liquid, such as water, over the level indicator. In other instances the device to which the level indicator is affixed may provide the heat when used to elevate the thermochromic material above its transition temperatures. When the device is then turned off and allowed to cool, the thermochromic indicator will then indicate the level of fluid within the device.

Figures 7, 8:
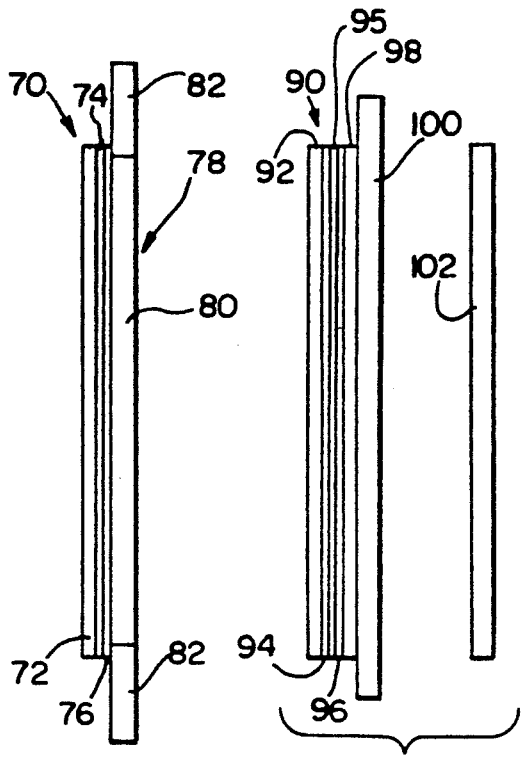
FIG. 7 is an edge elevation of a thermochromic level indicator employing a resistance heating element.
FIG. 8 is an edge elevation illustration of an alternative embodiment of a thermochromic level indicator affixed directly to a magnetic backing.

A thermochromic level indicator 70 which provides its own means of heating is illustrated in FIG. 7. The thermochromic level indicator 70 includes a transparent film 72 upon which at least one thermochromic layer 74 and an opaque backing layer 76 are applied. Applied to the opaque backing layer 76 opposite the thermochromic material 74 is a resistance heater 78, which can be printed directly upon the opaque backing layer 76. The resistance heater 78 includes a relatively small cross section resistance element 80 and a pair of laterally enlarged (toward and away from the viewer) contact portions 82. A pair of leads provided with electrical power from a power source (not shown) may be attached to the contacts 82 to impose an electrical current therebetween. The level indicator 70 is then applied to the tank with the resistance heater 78 adjacent the tank wall. The contacts 82 are preferably much wider or have a larger cross section than the resistance element 80 thereby having a much lower current density therethrough so that the majority of the heat is generated through the resistance element 80 which can in turn heat the thermochromic strip 74.

Referring to FIG. 8 there is shown another alternative embodiment of a thermochromic level indicator 90. The thermochromic level indicator 90 includes a transparent film 92 upon which at least two, and preferably three, thermochromic layers 94, 95 and 96 and an opaque passive, preferably white, backing layer 98 are applied. Due to the enhanced accuracy available through the use of two or more thermochromic materials the passive backing element 98 may be affixed, such as by an adhesive, to a magnetic element 100 and still provide accurate level determination capabilities. The magnetic element 100 is preferably a thin, for example 0.060 to 0.125 inch thick, flexible plastic having a ferrite material dispersed therein. As a result of the enhanced accuracy available through the use of at least two thermochromic materials in combination, the level indicator 90 provides a relatively accurate indication of liquid level within a tank. Also shown in FIG. 8 is a magnetic covering strip 102 of a size appropriate substantially to cover thermochromic layers thus preventing deterioration of the thermochromic materials from excessive exposure to ultraviolet radiation when the level indicator is not in use. The magnetic covering strip 102 may be used in conjunction with a level indicator including a magnetic material, such as the magnetic element 100, or may be used on level indicators not having a magnetic element, but which are applied to a ferrous tank by adhesive, for example.

In some instances, particularly when the level indicator is to be relatively permanently affixed to a tank or when the specific device upon which the level is to be employed is known it is advantageous to apply a reticle or scale to the transparent layer. The reticle can include markings corresponding, for example, to the percent to which the tank is full or the quantity of material in the tank, such as in gallons or liters, to aid the user.

While the invention is described above relative to thermochromic level indicators which are heated above a certain transition temperature and then allowed to cool to indicate the level of a material inside a tank, the invention similarly may be used with thermochromic materials which are transparent below ambient temperatures and are further cooled to undergo a change to a colored state. Such a level indicator will indicate the level of material in the tank as the level indicator warms back up to ambient temperature and the thermochromic materials reverse to their transparent states.

What is claimed is:

1. A thermochromic level indicator for determining the level of a material inside a container, comprising an elongate thermochromic strip; heating means for heating said thermochromic strip above its transition temperature when a current is supplied to said heating means; said heating means being applied to a non-viewing side of said thermochromic strip, and wherein said thermochromic strip includes at least two thermochromic materials of different opacities and transition temperatures, the thermochromic materials with greater opacities having relatively lower transition temperatures than the thermochromic materials with lesser opacities, and wherein said temperature responsive strip includes separate layers of said respective thermochromic materials.

2. The level indicator of claim 1, wherein said heating means includes a conductive strip applied to a non-viewing side of said elongate thermochromic strip.

3. The level indicator of claim 2, wherein said conductive strip is printed on the non-viewing side of said elongate thermochromic strip.

4. A thermochromic level indicator for determining the level of a material inside a container; comprising: a temperature responsive strip including at least two thermochromic materials of different opacities and transition temperatures, the thermochromic materials with greater opacities having relatively lower transition temperatures than the thermochromic materials with lesser opacities, wherein said temperature responsive strip includes separate layers of said respective thermochromic materials, and further including a removable magnetic strip of sufficient size substantially to cover said temperature responsive strip to shield said temperature responsive strip from ultraviolet radiation when not in use.

5. The level indicator of claim 4, wherein said layers of thermochromic materials are situated on said temperature responsive strip with the thermochromic layers of decreasing transition temperatures being closest to a viewer.

6. A thermochromic level indicator for determining the level of a material inside a container; comprising: a temperature responsive strip including at least two thermochromic materials of different opacities and transition temperatures, the thermochromic materials with greater opacities having relatively lower transition temperatures than the thermochromic materials with lesser opacities, wherein said thermochromic materials are microencapsulated, and are distributed in mixed relation on said strip, and further including a removable magnetic strip of sufficient size substantially to cover said temperature responsive strip to shield said temperature responsive strip from ultraviolet radiation when not in use.

7. The level indicator of claim 6, further including a magnetic strip affixed to a non-viewing side of said temperature responsive strip.

8. The level indicator of claim 6, wherein at least one of said thermochromic materials exhibits hysteresis upon cooling from a temperature above its transition temperature to a temperature below its transition temperature.

9. The level indicator of claim 6, further including magnetic means for holding said temperature responsive strip in direct contact with said container, said magnetic means being positioned on said temperature responsive strip opposite said container.

10. The level indicator of claim 6, wherein said temperature responsive strip includes a film support and wherein said microencapsulated thermochromic materials are mixed together and are applied to said film support by printing.

11. The level indicator of claim 4, further including a magnetic strip affixed to a non-viewing side of said temperature responsive strip.

12. The level indicator of claim 4, wherein at least one of said thermochromic materials exhibits hysteresis upon cooling from a temperature above its transition temperature to a temperature below its transition temperature.

13. The level indicator of claim 4, further including magnetic means for holding said temperature responsive strip in direct contact with said container, said magnetic means being positioned on said temperature responsive strip opposite said container.

14. A thermochromic level indicator for determining the level of a material inside a container, comprising an elongate thermochromic strip; heating means for heating said thermochromic strip above its transition temperature when a current is supplied to said heating means; said heating means being applied to a non-viewing side of said thermochromic strip, wherein said thermochromic strip includes at least two thermochromic materials of different opacities and transition temperatures, the thermochromic materials with greater opacities having relatively lower transition temperatures than the thermochromic materials with lesser opacities, and wherein said thermochromic materials are microencapsulated and are distributed in mixed relation on said strip.

15. The level indicator of claim 14, wherein said heating means includes a conductive strip applied to a non-viewing side of said elongate thermochromic strip.

16. The level indicator of claim 15, wherein said conductive strip is printed on the non-viewing side of said elongate thermochromic strip.

* * * * *